US006335819B1

(12) United States Patent
Cho et al.

(10) Patent No.: US 6,335,819 B1
(45) Date of Patent: Jan. 1, 2002

(54) ALL-OPTICAL REGENERATION AT HIGH BIT RATES USING AN ELECTROABSORPTION MODULATOR

(75) Inventors: Pak S. Cho, Gaithersburg; Julius Goldhar, Silver Spring, both of MD (US); Daniel Mahgerefteh, Los Angeles, CA (US)

(73) Assignee: University of Maryland, Riverdale, MD (US)

( * ) Notice: Subject to any disclaimer, the term of this patent is extended or adjusted under 35 U.S.C. 154(b) by 0 days.

(21) Appl. No.: 09/506,745

(22) Filed: Feb. 18, 2000

Related U.S. Application Data

(60) Provisional application No. 60/120,664, filed on Feb. 19, 1999.

(51) Int. Cl.[7] .................................................. H01S 3/00
(52) U.S. Cl. ........................................ 359/333; 359/176
(58) Field of Search .............................. 359/176, 344, 359/333

(56) References Cited

U.S. PATENT DOCUMENTS

| | | | |
|---|---|---|---|
| 5,532,861 A | 7/1996 | Pirio et al. ................... | 359/161 |
| 5,726,787 A | 3/1998 | Haus et al. ................... | 359/161 |
| 5,959,764 A | 9/1999 | Edagawa et al. ............. | 359/326 |
| 5,974,209 A | 10/1999 | Cho et al. ..................... | 385/28 |
| 6,101,027 A | * 8/2000 | Lee et al. ..................... | 359/344 |
| 6,108,125 A | * 8/2000 | Yano ............................ | 359/344 |
| 6,124,966 A | * 9/2000 | Yokoyama .................... | 359/339 |
| 6,215,566 B1 | * 4/2001 | Miyazaki et al. ............ | 359/122 |

OTHER PUBLICATIONS

"Error Free Operation of a 40Gbit/s All–Optical Regenerator," W.A. Pender et al., *Electronics Letters*, Mar. 14, 1996, vol. 32, No. 6, pp. 567–569.

"20 Gbit/s Optical 3R Regeneration Using Polarisation–Independent Monolithically Integrated Michelson Interferometer," K.S. Jepsen et al., *Electronics Letters*, Mar. 5, 1998, vol. 34, No. 5, pp. 472–473.

"All–Optical Regeneration at the Receiver of 10–Gb/s RZ Data Transmitted Over 30 000 km Using an Electroabsorption Modulator," Pak S. Cho et al., *IEEE Photonics Technology Letters*, Feb. 2, 2000, vol. 12, No. 2, pp. 205–207.

"All–Optical 2R Regeneration and Wavelength Conversion at 20 Gb/s using an Electroabsorption Modulator," Pak S. Cho et al., *IEEE Photonics Technology Letters*, Dec. 12, 1999, vol. 11, No. 12, pp. 1662–1664.

(List continued on next page.)

*Primary Examiner*—Mark Hellner
(74) *Attorney, Agent, or Firm*—Sterne, Kessler, Goldstein & Fox P.L.L.C.

(57) ABSTRACT

The present invention provides simultaneous all-optical regeneration (re-shape and re-amplify) and wavelength conversion using a reverse-biased electroabsorption modulator. The nonlinear optical transmission characteristic of the electroabsorption modulator reshapes the degraded input data by selective absorption of the optical noise and, therefore, increases the signal-to-noise ratio of the output. Reverse biasing the modulator allows fast recovery of the optical absorption for high data-rate operation without the detrimental bit-patterning effect. Error-free wavelength conversion and regeneration at 20 Gb/s was obtained with more than 3-dB improvement of the receiver sensitivity at a bit-error-rate of $10^{-9}$. Embodiments and applications of the present invention include an all-optical SEAM regenerator, an all-optical distributed feedback laser SEAM (DFB-SEAM) regenerator, an all-optical SEAM with fiber Bragg grating (SEAM-FBG) regenerator, an all-optical SEAM with polarizing beam splitter (SEAM-PBS) regenerator, an all-optical Mach-Zehnder interferometric (MZI-SEAM) regenerator, an all-optical 3-port MZI-SEAM regenerator, and a SEAM-based optimized receiver.

29 Claims, 11 Drawing Sheets

OTHER PUBLICATIONS

"All–Optical Regeneration," J.C. Simon et al., *ECOC'98*, Conference held Sep. 20–24, 1998 at Madrid, Spain, pp. 467–469.

"Novel Wavelength Converter Using an Electroabsorption Modulator: Conversion Experiments at Up to 40 Gbit/s," N. Edagawa et al., *OFC'97 Technical Digest*, Tuesday Afternoon, pp. 77–78.

"Effect of Hole Pile–Up at Heterointerface on Modulation Voltage In GaInAsP Electroabsorption Modulators," M. Suzuki et al., *Electronics Letters*, Jan. 19, 1989, vol. 25, No. 2, pp. 88–89.

"Transform–Limited Optical Pulse Generation up to 20–GHz Repetition Rate by a Sinusoidally Driven InGaAsP Electroabsorption Modulator," Masatoshi Suzuki et al., *Journal of Lightwave Technology*, Mar. 3, 1993, vol. 11, No. 3, pp. 468–473.

"Novel Optical–Regenerator Using Electroabsorption Modulators," Tetsuya Miyazaki et al., *OFC'99*, pp. 350–352.

"Electric Field Screening by Photogenerated Holes in Multiple Quantum Wells: A New Mechanism for Absorption Saturation," by Thomas H. Wood et al., *Applied Physics Letter*, vol. 57, No. 11, Sep. 10, 1990, pp. 1081–1083.

"Fast Escape of Photocreated Carriers Out of Shallow Quantum Wells," by J. Feldmann et al., *Applied Physics Letter*, vol. 59, No. 1, Jul. 1, 1991, pp. 66–68.

"Simultaneous Measurements of Electron and Hole Sweep–Out from Quantum Wells and Modeling of Photoinduced Field Screening Dynamics," by Jean Aristide Cavailles et al., *IEEE Journal of Quantum Electronics*, vol. 28, No. 10, Oct. 1992, pp. 2486–2497.

"Novel Optical–Regenerator Using Electroabsorption Modulators," Tetsuya Miyazaki et al., *IEICE Trans. Electronic . . .* , vol. E82–C, No. 8, Aug., 1999, pp. 1–5.

"20 Gbit/s Optical Regenerator Using Electroabsorption Modulators For All–Optical Network Application," T. Otani et al., *ECOC '99*, Sep. 26–30, 1999, Nice, France, pp. I–250–I–251.

"40 Gbit/s All–Optical Demultiplexing Using A Monolithically Integrated Mach–Zehnder Interferometer With Semiconductor Laser Amplifiers," E. Jahn et al., *Electronics Letters*, Oct. 12, 1995, vol. 31, No. 21, pp. 1857–1858.

"All–Optical Discrimination Based On Nonlinear Transmittance of MQW Semiconductor Optical Gates," Akira Hirano et al., *Journal of Lightwave Technology*, vol. 17, No. 5, May, 1999, pp. 873–884.

"Nonlinear Optical Transmission Induced by Large Transient Electric Field Enhancements in Photoconductive Zinc Selenide Switches," Pak S. Cho et al., *IEEE Transactions on Electron Devices*, vol. 41, No. 9, Sep., 1994, pp. 1529–1534.

"All–Optical 2R Regeneration At 40 Gbit/s in an SOA–Based Mach–Zehnder Interferometer," D. Wolfson et al., *OFC '99—IOOC*, San Diego, CA, pp. PD36–1–PD36–3.

"Novel Wavelength Converter Using an Electroabsorption Modulator," Noboru Edagawa et al., *IEICE Trans. Electron*, vo. E81–C, No. 8, Aug. 1998, pp. 1251–1257.

"Transmission of Dispersion–Managed Solitions at 20 Gbit/s Over 20 000km," G.M. Carter et al., *Electronics Letters*, vol. 35, No. 3, Feb. 4, 1999, pp. 233–234.

* cited by examiner (a)

(b)

20 ps/div

ALL-OPTICAL REGENERATION AT HIGH BIT RATES USING AN ELECTROABSORPTION MODULATOR

CROSS REFERENCE OF RELATED APPLICATIONS

This application claims the benefit of priority to U.S. application Ser. No. 60/120,664, filed Feb. 19, 1999 (incorporated in its entirety herein by reference).

STATEMENT AS TO RIGHTS TO INVENTIONS MADE UNDER FEDERALLY-SPONSORED RESEARCH AND DEVELOPMENT

Part of the work performed during development of this invention utilized U.S. Government funds, under federal grant contract no. MDA904-98-C-2105. The U.S. Government has certain rights in this invention.

BACKGROUND OF THE INVENTION

1. Field of the Invention

The present invention relates to optical communication including optical regeneration and/or wavelength conversion.

2. Related Art

Optical signals are increasingly relied upon to carry data at high bit rates over long distances in optical fiber transmission systems. For example, digital data is modulated on an optical carrier signal. The digital data is composed of bits (e.g., "0" and "1"). Ever higher bit rates are increasingly desired to increase the bandwidth or amount of data that can be carried over a fiber link. Optical carrier signals can have wavelengths in the visible to infrared spectrum. Wavelength-division multiplexing (WDM) fiber transmission systems support multiple optical carrier signals at different wavelengths. For example, two windows where optical carrier signals having wavelengths equal to around 1310 nm and/or 1550 nm and carrying data at bit rates greater than 10 Gigabits/sec are used or proposed for many high-speed WDM optical communication systems.

Optical signals degrade as they travel over long distances in optical fiber transmission systems. Such degradation is due to a number of factors, such as, loss, chromatic dispersion, fiber non-linearities, and other fiber impairments. These impairments reduce the signal-to-noise ratio of the optical signal. This can lead to bit loss and other errors, especially at high bit rates. Temporal as well as spectral content of the optical signal can be distorted. In-line optical amplifiers are used to compensate for loss. However, this amplification introduces optical noise to an optical signal which can accumulate to an unacceptable level when an optical signal has passed through long chains of in-line optical amplifiers.

Regeneration systems are used to "regenerate" optical signals. Regeneration can restore or improve aspects of a degraded optical signal. Optical 2R regeneration involves re-shaping and re-amplifying a degraded optical signal. Optical 3R regeneration involves re-shaping, re-amplifying, and re-timing a degraded optical signal.

Conventional optical regeneration techniques include two types: opto-electronic regeneration and all-optical regeneration. Opto-electronic regeneration uses direct detection to convert optical signals to the electrical domain, and then uses re-modulation to convert back to the optical domain. Opto-electronic regeneration is expensive and bandwidth-limited.

In all-optical regeneration, optical signals remain in the optical domain during regeneration. There is no need for conversion to the electrical domain. Also, all-optical regeneration of degraded data will be crucial for future large scale photonic networks with channels transmitted at variable distances and resulting in signal quality discrepancies between channels (Simon, J., et al., ECOC '98:467-469 (Sept. 1998)).

Three conventional all-optical regeneration techniques, however, also have drawbacks. First, fiber-based optical regeneration systems are bulky, increase latency, non-integrable, and environment-sensitive. For instance, a recent reported technique of all-optical regeneration at 40 Gb/s using Kerr effect in fibers showed an impressive performance (Pender W., et al, *Electron. Lett.* 32 (6): 567–569 (March 1996)). However, the operation of a Kerr regenerator requires a long length of fiber.

Second, regenerators that use semiconductor optical amplifiers in an interferometer add broadband optical noise (ASE noise) and are expensive to fabricate. Their speed is limited by the carrier recombination rate. The sinusoidal transfer function of semiconductor optical amplifiers also gives rise to weak thresholding, thereby limiting the signal-to-noise quality of the re-generated optical signal. For example, one interferometric wavelength converter showed impressive performances, but required complex fabrication steps. See, Wolfson, D., et al., "All Optical 2R regeneration at 40 Gb/s in an SOA-based Mach-Zehnder interferometer," in OFC '99, PD 36, San Diego, Calif. (February 1999).

Third, regenerators that use semiconductor saturable absorbers have a speed limited by the carrier recombination rate. They also generally suppress background noise only and cannot reduce noise in the "1" bit or optical signal peak. Spectral noise outside of the signal spectral band is not suppressed.

SUMMARY OF THE INVENTION

What is needed are methods and apparatuses for all-optical regeneration that use a semiconductor electroabsorption modulator (SEAM).

The present invention provides a method and apparatus for all-optical regeneration that uses one or more semiconductor electroabsorption modulators (SEAMs). The SEAM exhibits nonlinear optical transmission characteristics. The SEAM is under an electrical DC reverse bias. The SEAM can be temperature-controlled. Data is transcribed from a degraded optical signal to another stabilized optical signal of the same or different wavelength.

Embodiments and applications of the present invention include an alloptical SEAM regenerator, an all-optical distributed feedback laser SEAM (DFB-SEAM) regenerator, an all-optical SEAM with fiber Bragg grating (SEAM-FBG) regenerator, an all-optical SEAM with polarizing beam splitter (SEAM-PBS) regenerator, an all-optical Mach-Zehnder interferometric (MZI-SEAM) regenerator, an all-optical 3-port MZI-SEAM regenerator, and a SEAM-based optimized receiver.

FEATURES AND ADVANTAGES

One feature of the present invention involves all-optical regeneration. The optical output signal has a wavelength identical to the optical carrier signal (also called optical data signal). A stronger non-linear transfer function is obtained by applying a high non-time-varying DC reverse bias.

An all-optical regenerator is provided that reduces the noise level on the "0" and "1" bits of the regenerated optical signal.

An all-optical regenerator is provided that increases the extinction ratio (that is, ratio of power in the "1" bit to the power in the "0" bit).

An all-optical regenerator is provided that operates at a high data rate with a simple way to adjust the response time without the requirement of expensive high-speed electronic packaging, such as, an impedance matching network.

An all-optical regenerator is provided that suppresses optical noise including in the regenerated optical signal in the temporal domain as well as spectral domain.

An all-optical regenerator is provided that has strong thresholding, is output chirp adjustable, is compact, integrable, and capable of high-speed operation. The recovery rate of the absorption can be controlled by the DC reverse bias.

An all-optical receiver and method are provided that improves sensitivity of an optical receiver through an improved decision circuit and optimization of wavelength.

Commercial off the shelf (COTS) components can be used. Example COTS can include fiber pig-tailed devices, such as, discrete electro-absorption (EA) modulators and monolithically integrated distributed feedback laser and electro-absorption (DFB-EA) modulators.

According to another feature of the present invention, optical regeneration further includes wavelength conversion. The optical output signal has a wavelength different from the optical carrier signal or optical data signal. A relatively low DC reverse bias is applied compared to optical regeneration operation.

EXAMPLES

Examples of a semiconductor electroabsorption modulator that can be used with the present invention include a semiconductor material which exhibits electroabsorption effect (such as, Franz-Keldysh effect, quantum confined Stark effect, or the Wannier-Stark effect). Examples of a SEAM that can be used with the present invention include a semiconductor material which in the form of direct bandgap bulk semiconductor material, double heterostructure layers, quantum wells, or superlattice structure. Example semiconductor materials that SEAMs can be composed of are GaAs, InGaAs, InGaAsP, InP, InGaAlAs, GaAlAs, and InAlAs.

Optically, a SEAM can exhibit low polarization sensitivity as in bulk or strained quantum wells. The absorption of the SEAM is saturable under intense optical input. Low facet reflectivity of the SEAM can be achieved with AR coatings and/or angled facets. A short length SEAM less than or equal to 200 microns can be used to reduce optical power.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention. In the drawings.

The present invention will now be described with reference to the accompanying drawings. In the drawings, like reference numbers indicate identical or similar elements. Additionally, the left-most digit(s) of a reference number identifies the drawing in which the reference number first appears.

DETAILED DESCRIPTION OF THE PREFERRED EMBODIMENTS

Figure 1:
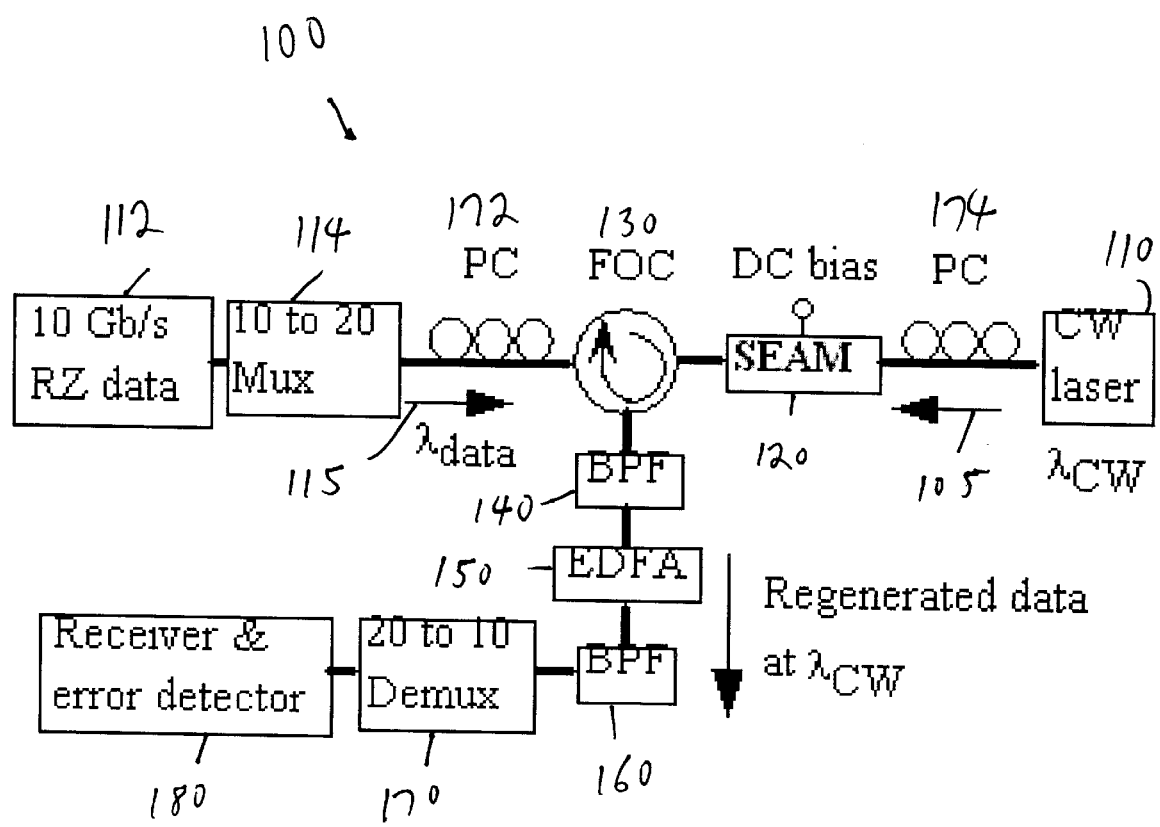
FIG. 1 is a diagram of an all-optical SEAM regenerator according to one embodiment of the present invention.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

1. Terminology

To more clearly delineate the present invention, an effort is made throughout the specification to adhere to the following term definitions consistently.

The term "optical" refers to radiation in the infra-red to visible spectrum.

The term "semiconductor electroabsorption modulator" (also referred to interchangeably as SEAM or EAM) refers to any type of electroabsorption modulator that exhibits nonlinear optical transmission characteristics. Examples of a semiconductor electroabsorption modulator that can be used with the present invention but are not intended to limit the present invention are a semiconductor material which exhibits electroabsorption effect (such as, Franz-Keldysh effect, quantum confined Stark effect, or the Wannier-Stark effect), and a semiconductor material in the form of direct bandgap, bulk semiconductor material, double heterostructure layers, quantum wells, or superlattice structure. Example semiconductor materials that SEAMs can be composed of include, but are not limited to, GaAs, InGaAs, InGaAsP, InP, InGaAlAs, GaAlAs, and InAlAs.

2. Overview
1. Non-Linear Optical Transmission in a Reverse-Biased SEAM The inventors have recognized that semiconductor electroabsorption modulators (SEAMs) are potential candidates for all-optical signal regeneration because of their nonlinear optical transmission characteristic and high-speed capability. See, Edagawa, M., et al., IEICE Trans. Electron. (E81-C/8):1251–1257 (August 1998). Nonlinear optical transmission in a reverse-biased SEAM is achieved by using an intense input optical pulse to produce a large number of photo-generated charged carriers in the highly absorptive waveguide. Drift and diffusion of these photo-generated charged carriers distort and screen the electric field and substantially decreases the absorption coefficient (Suzuki, M., et al, *Electron. Lett.* 25 (2):88–89 (January 1989); Wood, T., et al., *Appl. Phys. Lett.* 57 (11):1081–1083 (September 1990)). The distortion of the electric field is efficient because the holes tend to pile up at the interface due to their higher effective mass (Suzuki, M., et al., *Electron. Lett.* 25 (2):88–89 (January 1989); Wood, T., et al., *Appl Phys. Lett.* 57 (11):1081–1083 (September 1990)). Reduction of the electric field by the intense pulse significantly decreases the absorption and creates a transmission window for the pulse. Optical noise such as amplified spontaneous emission (ASE) noise from optical amplifiers, which is not as intense as the data, does not substantially affect the electric field and therefore is absorbed.

The recovery time of the absorption after the intense pulse is significantly less than the bit period (e.g., 50 picoseconds) under high reverse biases, which is crucial for high-speed operation. Fast recovery of the absorption at high bias voltages can be attributed to several mechanisms such as carrier sweep-out, reduction of the depletion capacitance by the electric field, and diffusive conduction in the waveguide (Feldman, J., et al., *Appl Phys. Lett.* 59 (1):66–68 (July 1991); Cavailles, J., et al., *IEEE J. Quantum Electron.* 28:2486–3497 (October 1992)). Note that external circuit parasitics of the EAM do not affect the fast recovery of the absorption. This makes all-optical EAM-based devices very attractive for high data-rate operation since complicated expensive high-speed electronic packaging is not required.

2. All-Optical Regeneration using a SEAM

The present invention pertains to a high-speed fiber device which performs in-fiber all-optical signal processing such as signal regeneration and/or wavelength conversion. As the name implies, optical signal regenerator processes corrupted input data and produce higher quality output data. The so-called 3R regeneration refers to the operation of re-shaping, re-timing, and re-amplifying of incoming degraded optical data. The degradation of optical data is a result of a variety of fiber transmission impairments such as amplified spontaneous emission noise from in-line fiber amplifiers. This invention focuses on the re-shaping and re-amplifying aspects of 3R regeneration. Wavelength conversion is a technique which transcribe transformation from an optical signal to another with different wavelength. It is applicable to wavelength division multiplexed (WDM) fiber-optic nodes and networks.

The present invention includes a semiconductor electroabsorption modulator (SEAM) (also referred to as a EAM) under reverse-biased condition. For example, a packaged fiber-pigtailed EAM fabricated from InGaAsP-based material operates near the 1550 nm wavelength region. The optical absorption coefficient, $\alpha$, of the EAM increases approximately linearly with the reverse bias voltage depending on the wavelength and the EAM characteristics. Due to the exponential dependence of the transmission on a, the optical power transmitted through the EAM changes nonlinearly with the reverse-biased voltages. The nonlinear transmission of the EAM can be controlled electrically by applying time-varying electrical signals or optically by injecting an intense optical pulse to decrease the electric field of a reverse-biased EAM. Reduction of the internal electric field of the EAM is caused by a build-up of a large number of photo-carriers produced by the intense optical pulse. These photo-carriers screen and distort the applied electric field causing the internal field to collapse. As a result, the optical absorption decreases and the transmission of the EAM increases. The EAM performs as an optically-controlled nonlinear transmission gate in this invention.

The physical principle of this invention is described as follows. Two optical beams of the same or different characteristics (such as the same or different wavelengths, polarization states, or direction of propagation) are simultaneously launched into a fiber-pigtailed EAM though a fiber-optic circulator or a coupler. The first beam (referred to as pump) is a pulse train encoded with binary digital information using amplitude shift keying. These pulses are corrupted as a result of transmission impairments described earlier such as added optical noise. The pump signal has enough optical peak power in each one-bit to cause significant optical absorption saturation in the EAM. The peak power of the optical noise in the zero-bit, however, is much weaker and does not affect the applied field, and thus the absorption, significantly. The second continuous-wave (CW) beam (referred to as probe) propagates through the EAM experience the nonlinear change in the transmission as a result of the cross-absorption modulation induces by the pump pulses. The EAM is maintained at a constant reverse-biased voltage such that the transmission of the probe is very low in the absence of the pump pulses. The reverse-biased voltage also allows fast recovery of the absorption by sweeping photo-carriers out of the waveguide region of the EAM. A short pulse with a pulse width comparable to that of the pump pulse is therefore generated at the probe wavelength whenever a pump pulse is present. As a result of the nonlinear transmission characteristics of the EAM, a replica of the pump data is produced at the wavelength of the probe signal without the optical noise that corrupt the pump signal.

In order to suppress the noise in the one bits, the absorption of the SEAM is required to saturate to nearly a constant in response to intensity noise in the one bits. As a result, intensity fluctuation of the one bits would not cause further change or reduction of the absorption of the SEAM. Since the absorption saturation is driven by the reduction of the electric field, the absorption should remain constant as the electric field decreases to zero. In other words, the derivative of the absorption with respect to the electric field should approach to zero as the electric field reduces to zero. This can be achieved with SEAM which exhibits a sharp absorption edge and a low and constant below-gap absorption even under bias voltages. SEAMs using quantum-confined Stark effect in quantum wells structures exhibit such a steep absorption edge because of the exciton absorption effect. A steep absorption edge also enhances the thresholding response of the SEAM regenerator because large change in transmission can be achieved with a narrow range of electric field.

See, also, the inventors' article, All Optical 2R Regeneration and Wavelength Conversion at 20 Gb/s using an Electroaborption Modulator, "*IEEE Photonics Technology Letters*, Vol. 11, no. 12, pp. 1662–1664, December 1999 (incorporated in its entirety herein by reference).

3. All-Optical SEAM Regenerator

FIG. 1 shows an all-optical SEAM regenerator 100 according to one embodiment of the present invention. All-optical SEAM regenerator 100 includes a probe laser 110, data source 112, multiplexer 114, SEAM 120 and fiber optic circulator (FOC) 130. A bandpass filter 140 is provided along an optical path between the output of fiber circulator 130 and a fiber amplifier 150. Polarization controllers 172, 174 are provided to further control polarization or maintain polarization in a predetermined state to accommodate any polarization sensitivity of SEAM 120.

Probe laser 110 emits a probe signal 105. Probe laser 110 can be a continuous wave (CW) distributed-feedback semiconductor diode laser (DFB laser). Probe signal 105 is launched through polarization controller 174 into SEAM 120.

A pump source includes data source 112 and multiplexer 114. In one example shown in FIG. 1, data source 112 provides optical signals (also called pump pulses) that carry return-to-zero (RZ) data at bit rates around 10 Gb/s. Multiplexer 114 multiplexes the optical signals to even higher bit rates (e.g., 10 to 20 Gb/s). A pump signal 115 having intensity modulated pump pulses at a wavelength $\lambda_{data}$ is then launched through polarization controller 172, and fiber circulator 130 to SEAM 120.

The pump signal 115 and the probe signal 105 enter SEAM 120 in a counter-propagating configuration as shown in FIG. 1. Fiber optic circulator 130 efficiently couples both the pump and probe signals 115, 105 into SEAM 120 and separates the pump signal 115 from the probe beam 105 at an output passing to bandpass filter 140. An optical regeneration signal 125 is output from fiber optic circulator 130. At the output port which is a reflection port of the fiber optic circulator 130, an optical bandpass filter 140 is used to suppress the residual reflected pump pulses from the front facet of the SEAM 120. Fiber amplifier 150 (e.g., an ebrium-doped fiber amplifier) is used to compensate the insertion loss of the SEAM 120.

Optical regeneration signal 125 is essentially a replica of pump signal 115 re-shaped and re-amplified by all-optical SEAM regenerator 100 to remove or reduce corrupted data. Corrupted data in both the "0" and "1" bits can be removed at high bit rates. Optical regeneration signal 125 has a wavelength equal to the wavelength $\lambda_{probe}$ (also called $\lambda_{CW}$) of the probe laser 110. The wavelength $\lambda_{probe}$ can be any wavelength within the infra-red to visible spectrum depending upon the particular laser source used. In one example, $\lambda_{probe}$ is within a fiber optic communication wavelength window, including but not limited to, the 1310 nm band or 1550 nm band windows. The 1550-nm band is the C-band (1530–1565 nm) and the L-band (1560–1610 nm) is supported by erbium-doped fiber amplifiers.

Although this example is described with respect to a continuous wave (CW) laser probe source, the present invention is not intended to be so limited, as probe laser 110 can be any type of laser source including modulated lasers (directly modulated or externally modulated).

All-optical SEAM regenerator 100 can be provided in-line along a fiber link in a fiber optic communication system or near a terminal point of a fiber link. FIG. 1 shows one example where all-optical SEAM regenerator 100 is further optically coupled to an optical bandpass filter 160, demultiplexer 170, and receiver and error detector 180. Bandpass filter 160 is provided along an optical path between the output of fiber amplifier 150 and an input to demultiplexer 170. Demultiplexer 170 demultiplexes optical regeneration signal 125 and provides the demultiplexed optical regeneration signal to receiver and error detector 180. Receiver and error detector 180 can be any type of conventional receiver that transduces optical regeneration signal 125 to an electrical signal for further communication or signal processing in the electrical domain.

One feature of the present invention involves all-optical regeneration. Optical regeneration signal 125 and probe signal 105 have wavelengths identical to pump signal 115 ($\lambda_{data} = \lambda_{probe} = \lambda_{regenerated}$). A stronger nonlinear transfer function is obtained by applying a high DC reverse bias to SEAM 120.

According to another feature of the present invention, all-optical SEAM regenerator 100 further includes wavelength conversion. Optical regeneration signal 125 has a wavelength different from the pump signal. ($\lambda_{probe} = \lambda_{regenerated}$, and $\lambda_{probe} \approx \lambda_{data}$. In this case, a relatively low DC reverse bias is applied to SEAM 120 compared to regeneration operation. An example implementation of the all-optical SEAM regenerator 100 using wavelength conversion is described further below with respect to FIGS. 2–5.

Figure 2:
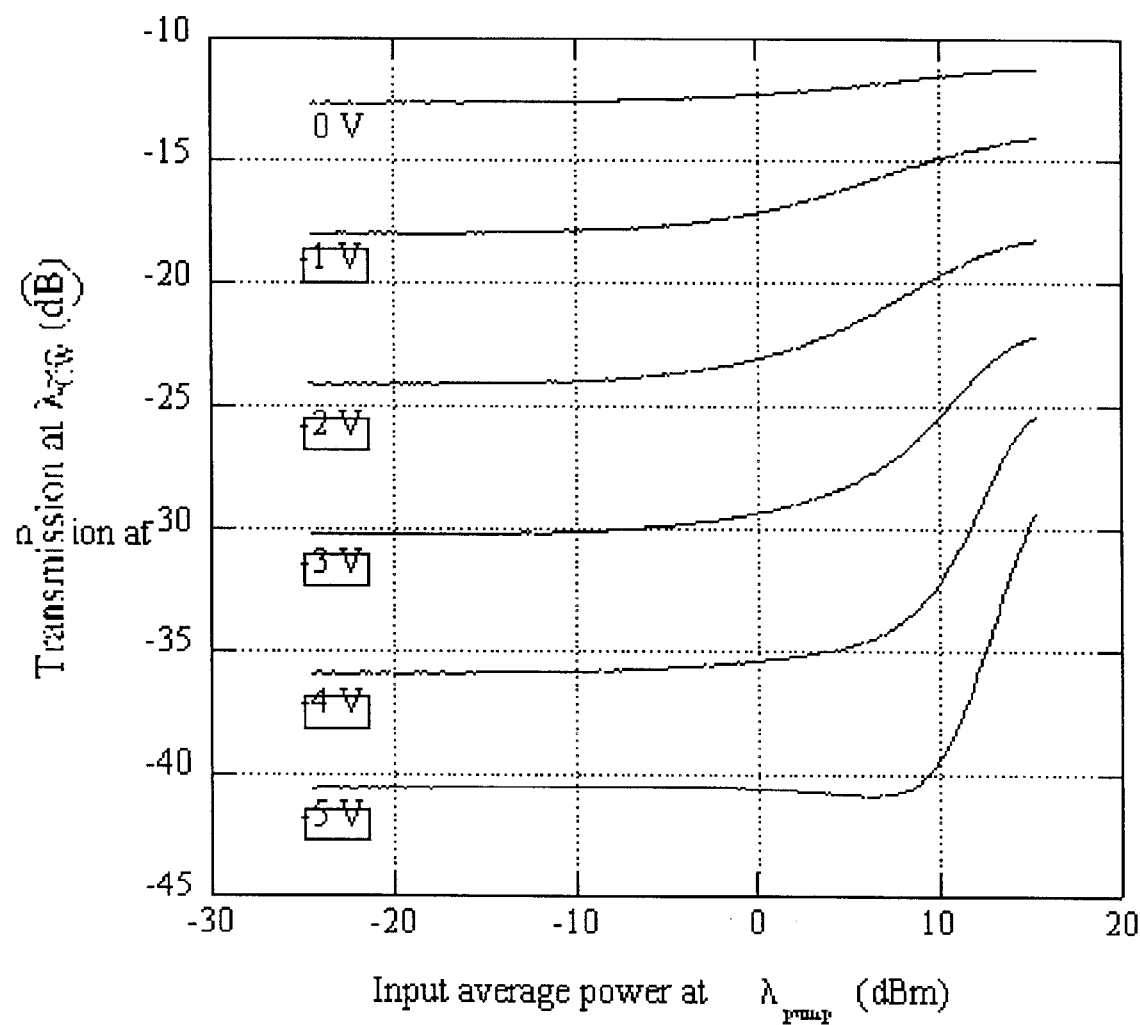
FIG. 2 is a diagram that plots fiber-to-fiber transmission of a CW probe versus input powers of a pump signal in one example of the present invention.

1. Example Implementation of All-Optical SEAM Regenerator with Wavelength Conversion When an intense optical pump signal 115 propagates through SEAM 120, a CW probe signal 105 traversing the waveguide experiences the transmission followed by a fast resumption of the absorption. As a result, a short pulse in optical regeneration signal 125 is generated at the wavelength of the probe signal 105. Low intensity optical noise is absorbed without changing the transmission state of SEAM 120. The fiber-to-fiber transmission of a continuous-wave (CW) probe signal 105 at 1552 nm through a reverse-biased SEAM 120 measured as a function of input pump power for bias voltages from 0 to −5 volts is shown in FIG. 2. The pump signal is a 10 GHz pulse train at 1545 nm at half maximum (fwhm) approximately 2 picoseconds. A relatively weak CW probe signal 105 (−5 dBm) was used in order to reduce its effect on the transmission response of the SEAM 120. A nonlinear transmission characteristic especially at higher magnitude bias voltages is readily seen which can be exploited to suppress optical noise particularly those that degrade the zero bits.

An example implementation of all-optical SEAM regenerator 100 that includes wavelength conversion is now described. A 20-Gb/s RZ data pump signal 115 together with a counter-propagating CW probe signal 105 are launched simultaneously into a fiber-pigtailed bulk InGaAsP electro-absorption modulator 120 through fiber-optic circulator 130. Circulator 130 is used to separate the input RZ data and the regenerated output. SEAM 120 is biased at −3.59 V which gives a transmission loss of more than 30 dB at the CW wavelength in the absence of data pulses in pump signal 115. Polarization controllers 172, 174 are used to control the polarization state of the inputs to account for the polarization-dependent loss (−1.56 dB) of the SEAM 120. Details of an example SEAM 120 modulator can be found in Suzuki, M., et al., *J. Lightwave Technol.* 11:468–473 (March 1993) (incorporated by reference herein in its entirety). The input average powers (in-fiber) to the SEAM 120 of the data pulse pump signal 115 and CW probe signal 105 were +17.9 dBm (6 pJ per pulse) and +9.5 dBm, respectively. The fiber coupling loss was 3 dB/facet. The measured vacuum wavelength of the RZ data pump signal 115 and the CW probe signal 105 were 1545.369 nm ($\lambda_{data}$) and 1543.777 nm ($\lambda_{probe}=\lambda_{data}-200$ GHz), respectively.

The 20-Gb/s RZ data pump signal 115 is produced in this example by passive multiplexing a 10-Gb/s pseudorandom bit sequence ($2^{31}-1$ long) generated by external modulation with a LiNbO$_3$ modulator of the pulse train from a gain-switched DFB laser driven at 10 Ghz. The gain-switched pulses had a FWHM of ~10 ps after compression in a dispersion-compensating fiber. The bias of the LiNbO$_3$ data modulator is adjusted to generate the degraded data with unsuppressed zeros producing an extinction ratio (ratio of the one to zero bit) of ~5.5 dB. The converted data pass through the reflection port of the circulator (see FIG. 2) followed by a band-pass filter to suppress the residual reflected pulses at $\lambda_{data}$ from the front facet of the SEAM 120. The converted data is then amplified using erbium-doped fiber amplifier 150 (EDFA) to compensate the transmission loss of the SEAM 120. This is followed by another band-pass filter 160 to suppress EDFA 150 noise. A LiNbO$_3$ modulator driven by the 10-GHz clock output from a pattern generator was used as demultiplexer 170 to demultiplex the 20-Gb/s RZ signal to 10 Gb/s before launching to receiver and the error detector 180.

2. Results and Discussion

The 20-Gb/s eye patterns of the input ($\lambda_{data}$) and the regenerated output ($\lambda_{CW}$) measured at receiver 180 are shown in FIGS. 3A and 3B, respectively. The ringing between the eyes are caused by the detector response. The regenerated eye shown in FIG. 3(b) is open with a higher extinction ratio of 11.3 dB compared with 5.5 dB of the input. The autocorrelation trace of the 20-Gb/s regenerated RZ pulse fits well with a Gaussian profile and the deconvolved pulse width was 13 ps. The estimated recovery time of the transmission in this case was 9.3 ps. This corresponds to an approximated optical modulation bandwidth of more than 37 GHz compared with the modulation bandwidth of only 18 GHz with electrical RF input. FIG. 4 shows the bit-error-rate (BER) performance of the regenerated RZ data at $\lambda_{probe}$ (also called $\lambda_{CW}$) (square) and the input data at $\lambda_{data}$ (triangle). An improvement of receiver sensitivity of 3.65 dB at BER of $10^{-9}$ was obtained. Wavelength conversion and regeneration to a longer wavelength at 1546.959 nm ($\lambda_{probe}=\lambda_{data}+200$ GHz) was also performed at 20 Gb/s. Similar improvement in extinction ratio and increase of receiver sensitivity was observed.

The EAM was also tested at 40 Gb/s. Due to the limited available input power the pulse energy is reduced at high data-rate which leads to a lower extinction ratio of the output. A conversion penalty of 3.5 dB was obtained as a result. Demultiplexing of the 40-Gb/s RZ data was performed using a LiNbO$_3$ modulator driven by a 10-GHz clock, which also contributed to the penalty. However, error-free wavelength conversion at 40 Gb/s can still be achieved. One drawback of the present EAM is the significant insertion loss of 10 dB without bias at the operating wavelength. Reverse bias of the EAM is required for reasonable extinction ratio and fast recovery of the absorption the expense of higher transmission loss. Using higher input power of the CW probe signal and/or post-amplification to boost the power of the converted signal as in this case compensates the transmission loss and ensures sufficient signal level at the receiver.

Figure 3:
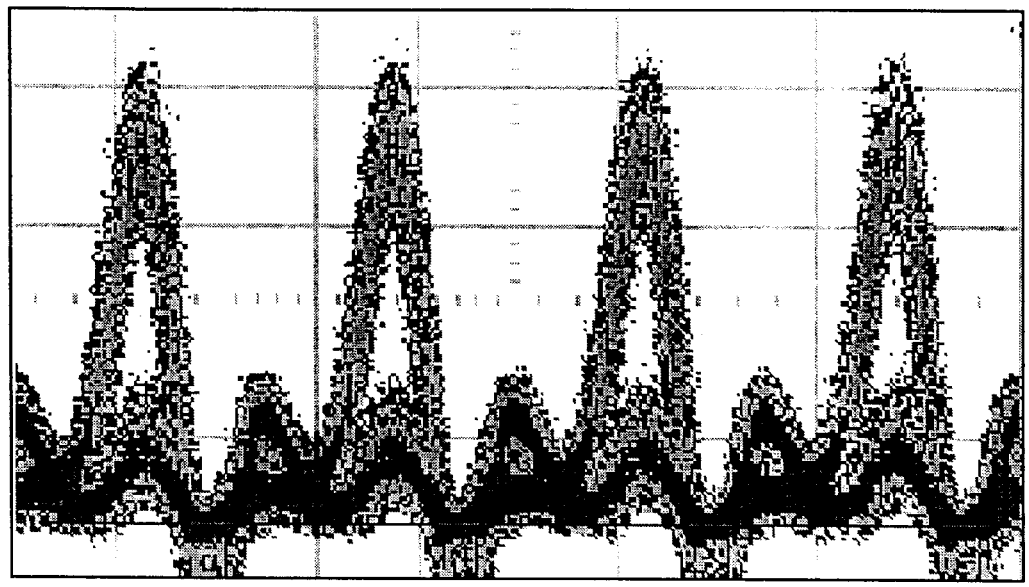
FIG. 3A is an example eye diagram of RZ data at 20 Gb/s for an input signal at $\lambda_{data}$.
FIG. 3B is another example eye diagram of RZ data at 20 Gb/s for the regenerated signal at $\lambda_{CW}$.
Figure 3:
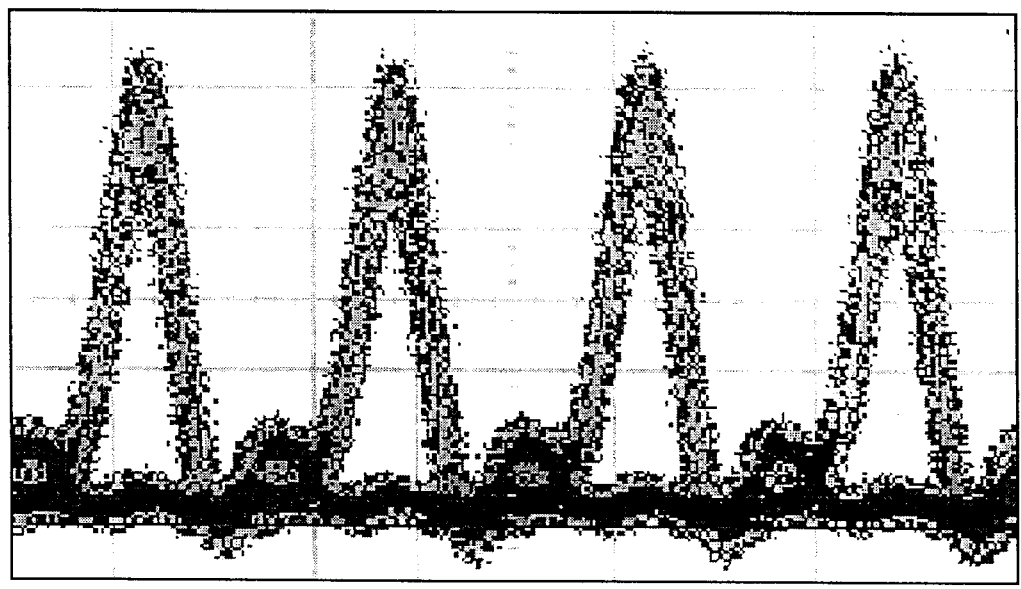
Figure 4:
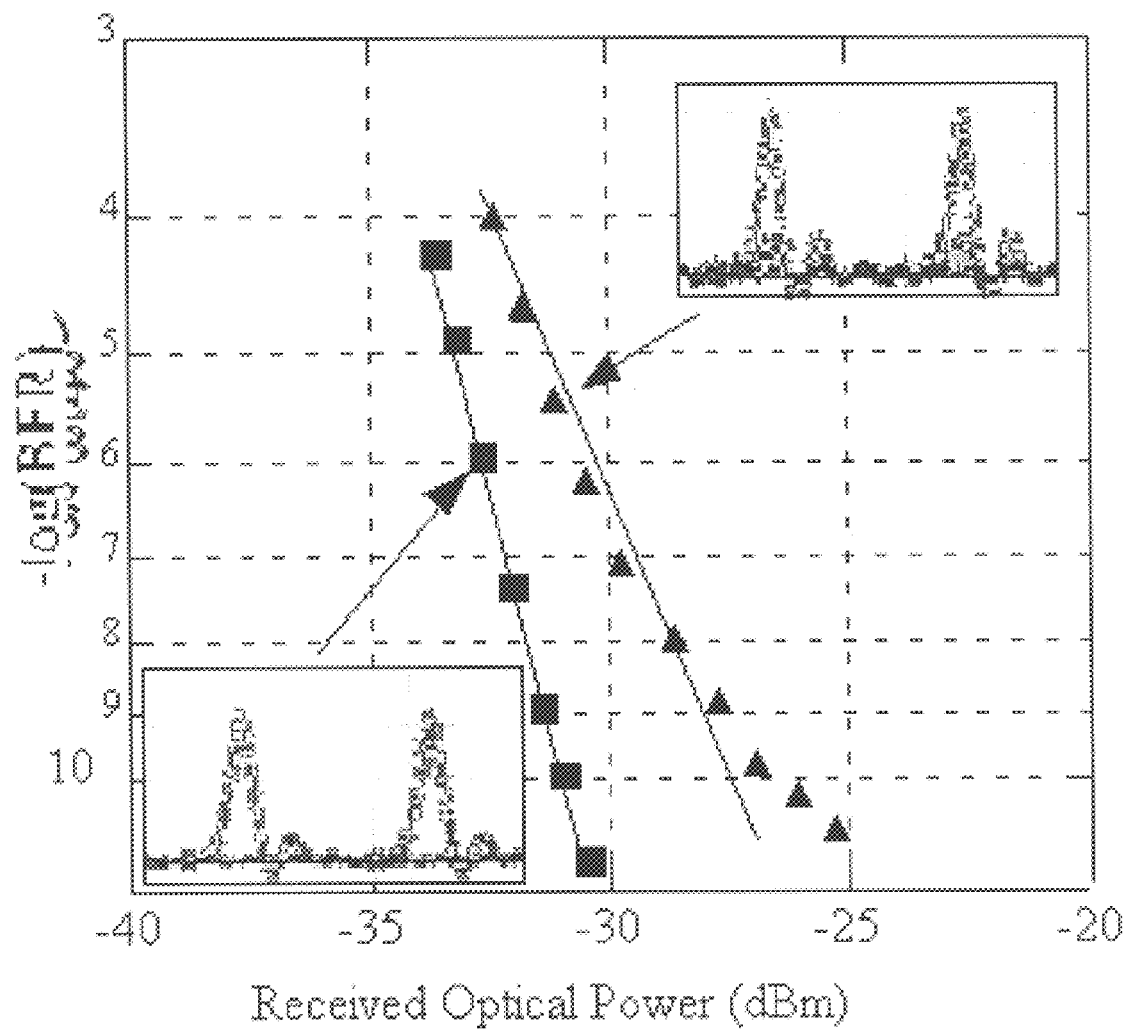
FIG. 4 is a diagram of bit error rate (BER) measurement of the input (triangle) and the regenerated output (square) at 10 Gb/s after demultiplexed from 20 Gb/s. Inserts show the demultiplexed 10-Gb/s eye diagrams of the input and the regenerated signal.
Figure 5:
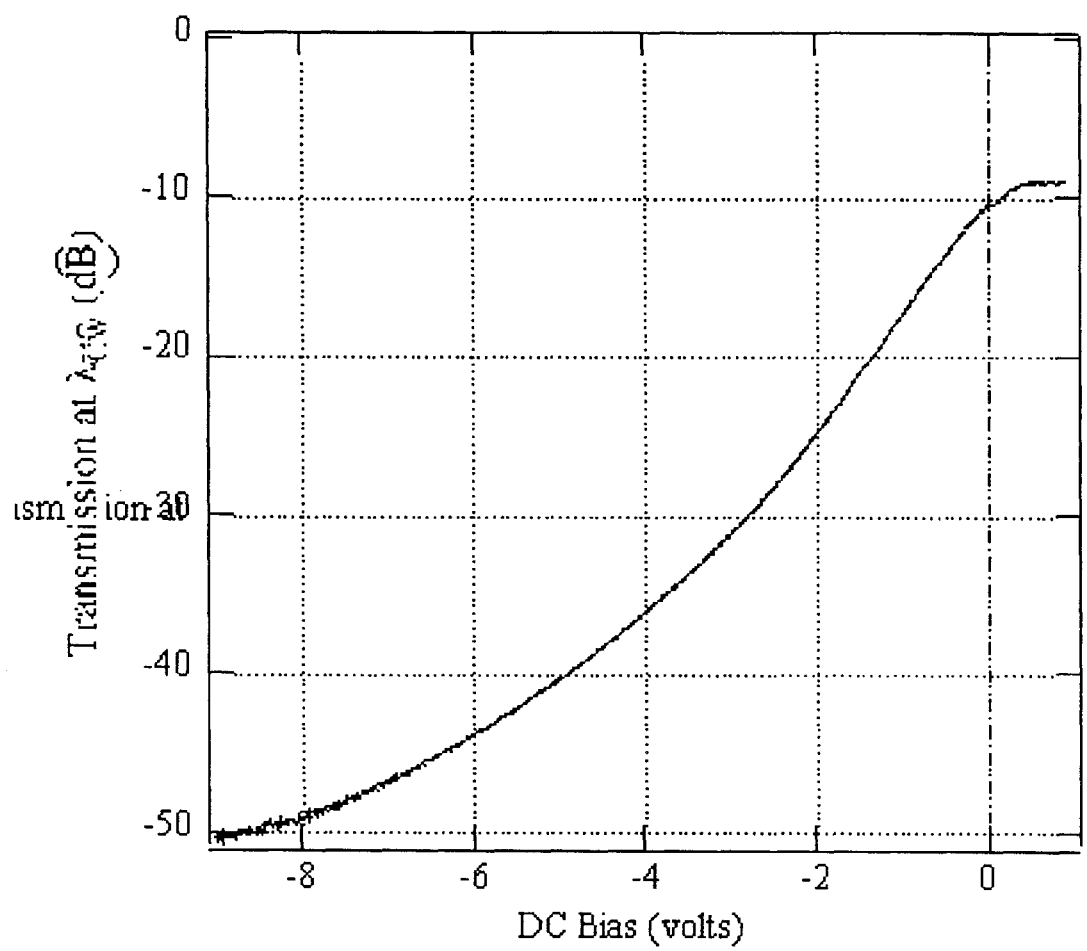
FIG. 5 is a diagram that plots fiber-to-fiber transmission of a CW probe versus a reversed bias voltage in one example of the present invention.

Note that there is no observable reduction of the noise in the one bits as can be seen in the example of FIG. 3. This is because the absorption of SEAM 120 had not completely reduced to a constant value with the maximum available input power. FIG. 5 shows the fiber-to-fiber transmission of SEAM 120 versus bias with a CW probe input at $\lambda_{probe}$ (1543 nm). In order to suppress noise in the marks the absorption of the EAM should saturate and remain at a constant low value when the input power reaches a certain value. This implies that the transmission of the EAM should approach to a constant value as the reverse bias reduces to zero. Therefore, it is clear from FIG. 5 that the present EAM is not capable to suppress amplitude noise in the marks. However, as would be apparent to persons skilled in the art given this description, one can eliminate the noise in both the one and zero bits with an optimally designed modulator, such as a SEAM 120 that uses quantum well structures.

In one example, the degraded input data was generated by biasing the external modulator which does not represent real situations where the data are more likely to be corrupted by transmission impairments such as ASE noise buildup from optical amplifiers. Also at present this EAM regenerator can only reduce noise in the zero level as described above. The utility of the EAM is realized in dispersion-managed soliton systems, where the propagation distance is mostly limited by accumulation of ASE noise in the spaces (Carter, G.M., et al., *Electron. Lett.* 35:233–234 (1999)). The level of the marks is equalized upon propagation by the action of the fiber nonlinearity and passive filtering. Using the EAM regenerator at the receiver, the inventors have demonstrated error-free propagation over 30,000 km through the dispersion-managed system at 10 Gb/s. Without regeneration according to the present invention, however, the maximum error-free transmission distance reduces to less than 24,000 km limited by the rapid growth of accumulated ASE noise.

In one example implementation, the present invention provides simultaneous wavelength conversion and 2R regeneration of a 20-Gb/s RZ data using a reverse-biased EAM. The extinction ratio of the converted signal was increased by 5.8 dB and the BER performance showed an improvement of receiver sensitivity of more than 3 dB at a BER of $10^{-9}$ after regeneration. The high-speed optical modulation characteristic of the EAM was also verified up to 40 Gb/s.

Figure 6:
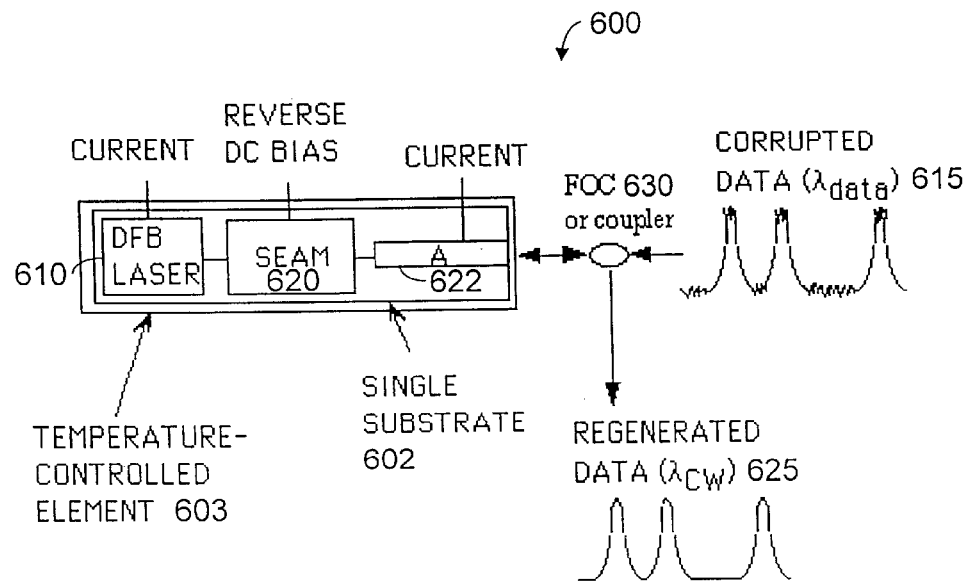
FIG. 6 is a diagram of an all-optical DFB-SEAM regenerator according to one embodiment of the present invention.

4. Integrated Distributed Feedback Diode Laser and Semiconductor Electroabsorption Modulator (DFB-SEAM) Regenerator FIG. 6 is a diagram of an all-optical DFB-SEAM regenerator 600 according to one embodiment of the present invention. All-optical DFB-SEAM regenerator 600 includes a DFB diode laser 610 integrated with a SEAM 620 on a single substrate 602. Corrupted data ($\lambda_{data}$) of pump signal 615 is launched into the regenerator through a fiber-optic circulator 630, a fiber coupler, or a polarizing beam splitter. A current-controlled active amplifying waveguide region (A) 622 increases the intensity of the corrupted data. The transmission of the reverse-biased SEAM 620 is controlled nonlinearly by the intensity of the corrupted data. Integrated DFB diode laser 610 produced a continuous (CW) light of $\lambda_{CW}$ which traverses through SEAM 620. The CW light experiences the nonlinear change in transmission imposed by the corrupted data. As a result, a regenerated version of the corrupted data is transcribed to the CW light. The optical regenerated signal 625 exits the device into a fiber-optic circulator 630 or a fiber coupler into a fiber separated from the inconming corrupted data. Since the corrupted data is counter-propagating with the CW light, $\lambda_{data}$ and $\lambda_{CW}$ can be the same. The DFB-SEAM regenerator resides on a temperature-controlled element 603 such as a Peltier element to stabilize and maintain the temperature of the device at a constant.

This embodiment suppresses the noise of both one and zero levels of the corrupted data. Further, $\lambda_{data}$ and $\lambda_{CW}$ can be the same. Also note that a different biasing condition of the SEAM 620 is required for regeneration than for wavelength conversion. Note that in some instances an intense pulse in the corrupted data at $\lambda_{data}$ transmitted through the SEAM 620 may reach the DFB laser 610. The intense pulse could perturb the laser output of the DFB laser 610 through gain saturation. This could lead to a lower optical power at the output of the DFB laser 610 which may not be desirable. However, the interaction between the DFB laser 610 and the transmitted pulse in the corrupted data could be significantly reduced by selecting the proper polarization state of the corrupted data at $\lambda_{data}$. Such a polarization state minimizes gain saturation in the DFB laser 610 induced by the corrupted data. In this case it is preferable that the SEAM 620 be polarization insensitive. In other words, the absorption characteristics of the SEAM 620 is independent of the polarization state of the input optical signal. Polarization insensitivity can be achieved over a range of wavelengths and bias voltages by employing a strained quantum wells structure.

Figure 7:
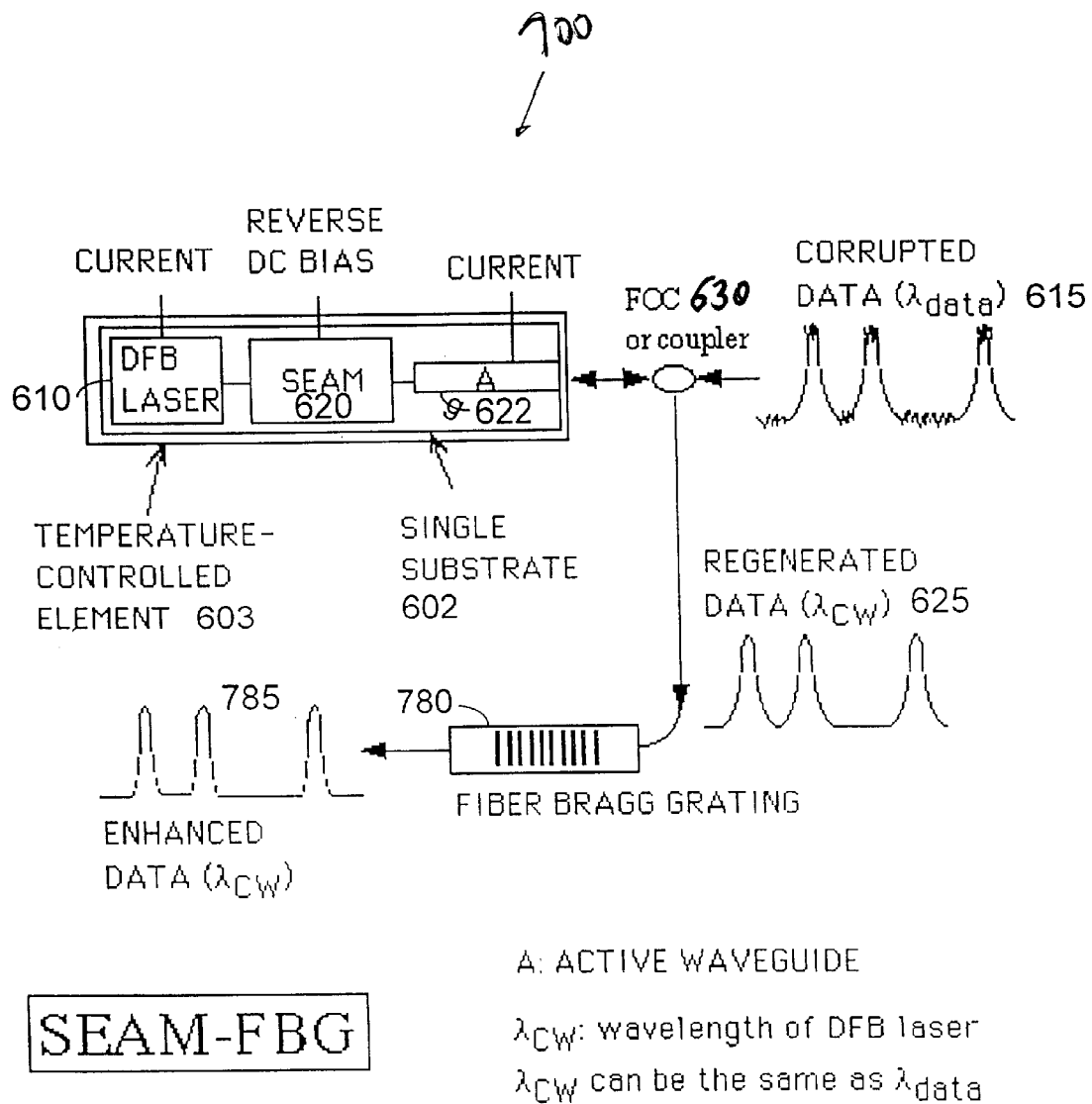
FIG. 7 is a diagram of an all-optical SEAM-FBG regenerator according to one embodiment of the present invention.

5. Semiconductor Electroabsorption Modulator and Fiber Bragg Grating (SEAM-FBG) Regenerator FIG. 7 is a diagram of an all-optical SEAM-FBG regenerator 700 according to one embodiment of the present invention. All-optical SEAM-FBG regenerator 700 includes an integrated DFB-SEAM, as described with reference to FIG. 6, followed by a fiber Bragg grating 780 at the output. The optical regenerated signal 625 contains phase modulation which can be converted to useful amplitude modulation using an optical discriminator, such as, fiber Bragg grating 780 or a Fabry-Perot filter. As a result, the edges of optical regenerated signal 625 are sharpened to obtain an enhanced optical regeneration signal 785. The wavelength of the CW probe light should be placed along the transmission edge of the fiber grating discriminator 780 in order to maximize the effectiveness of the conversion of phase to amplitude modulation. More detailed operation of the fiber grating discriminator can be found in U.S. Pat. No. 5,974,209 (incorporated herein in its entirety by reference).

6. All-Optical SEAM-PBS Regenerator

Figure 8:
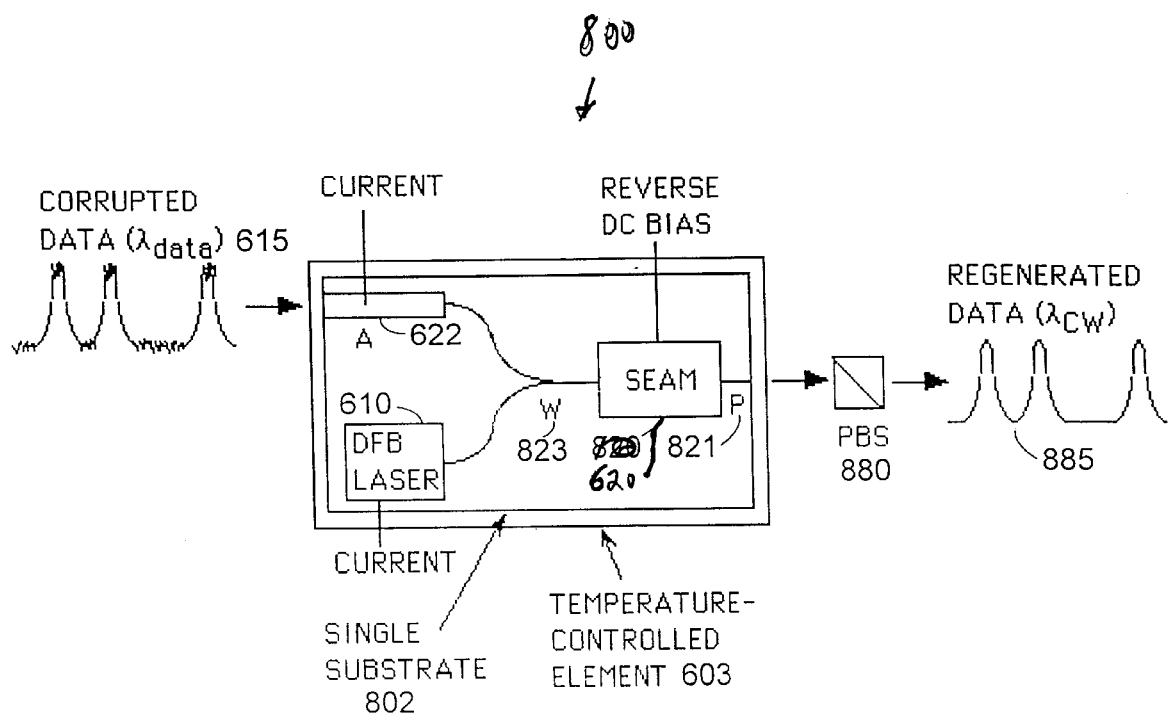
FIG. 8 is a diagram of an all-optical SEAM-PBS regenerator according to one embodiment of the present invention.

FIG. 8 is a diagram of an all-optical SEAM-PBS regenerator 800 according to one embodiment of the present invention. All-optical SEAM-PBS regenerator 800 uses a co-propagation arrangement. In this arrangement, active waveguide 622 and a DFB laser 610 each have an output optically coupled by a waveguide coupler W 823 to one side (input facet) of SEAM 620. A passive waveguide P 821 couples light from SEAM 620 out to a polarizing beam splitter 880. A pump signal 615 having a wavelength $\lambda_{data}$ with corrupted data enters one end of active waveguide A 622.

Because the pump signal 615 with corrupted data and the probe CW signal emitted by DFB laser 610 co-propagate, polarization beam splitter 880 is utilized to separate the corrupted data from the regenerated signal at the output. The polarization state of the pump signal 615 with corrupted data can be adjusted to be orthogonal to that of the CW probe light. In particular, a feedback control mechanism can be used to adjust and maintain the polarization of the corrupted data at the proper orthogonal state. At the SEAM output, polarization beam splitter 880 is used to separate the two orthogonally polarized signals into different fiber outputs. An optical regeneration signal 885 is then output from the side of PBS 880. In this case, $\lambda_{data}$ and $\lambda_{CW}$ can be the same for optical regeneration applications.

Figure 9:
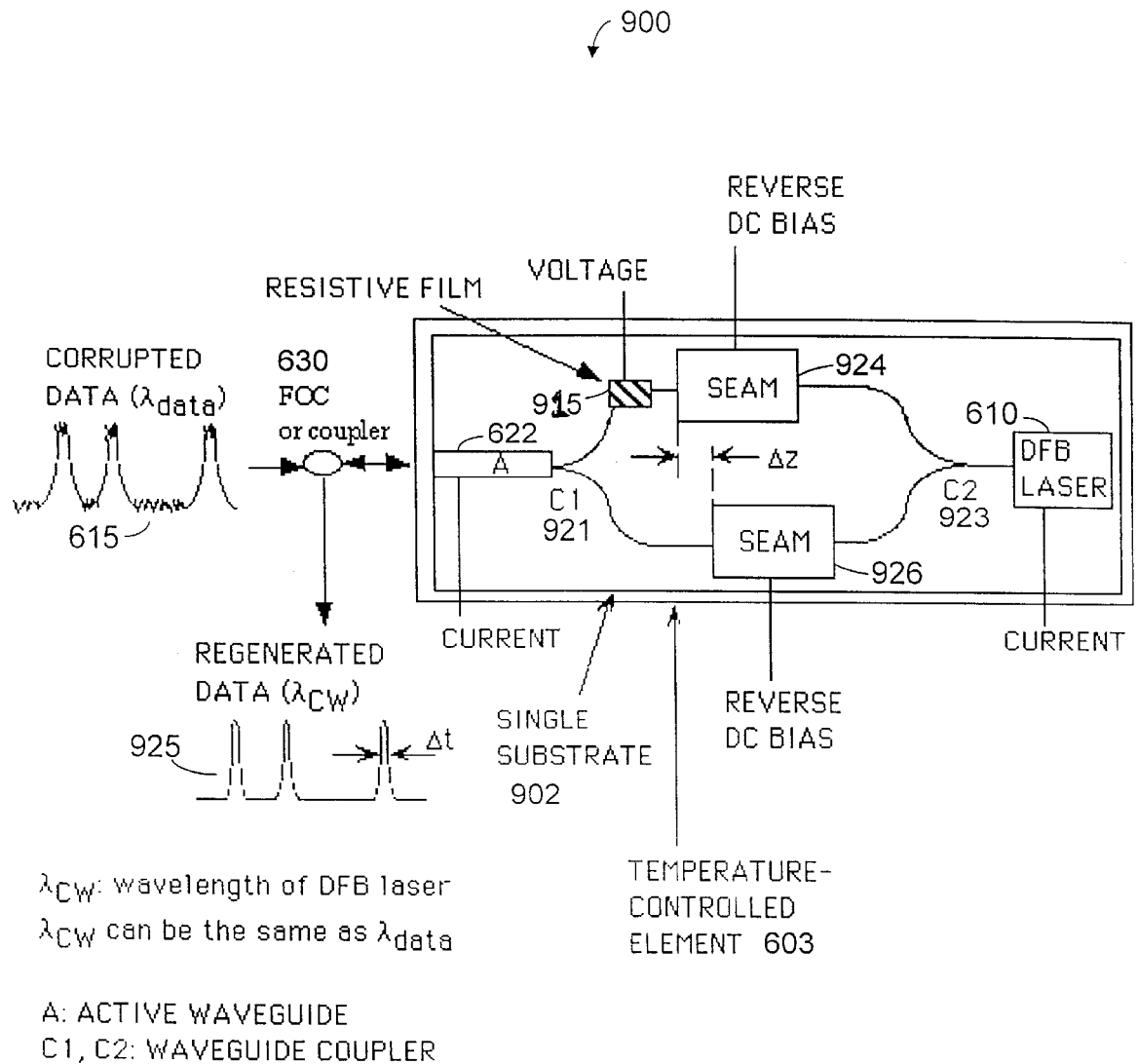
FIG. 9 is a diagram of an all-optical MZI-SEAM regenerator according to one embodiment of the present invention.

7. Mach-Zehnder Interferometer Semiconductor Electroabsorption Modulator (MZI-SEAM) Regenerator FIG. 9 is a diagram of an all-optical MZI-SEAM regenerator 900 according to one embodiment of the present invention. All-optical MZI-SEAM regenerator 900 includes two SEAMs 924, 926 in two arms of an integrated Mach-Zehnder interferometer (MZI). SEAM 924 is displaced from SEAM 926 by a distance $\Delta z$. Pump signal 615 with corrupted data (at wavelength $\lambda_{data}$) is launched into an input port of the device at which an active amplifying region (A) increases the intensity of the data. Waveguide coupler C1 921 splits the pump signal 615 with corrupted data into the arms of the MZI. The transmission of each SEAM 924, 926 reduces nonlinearly with the intensity of the data signal. A CW probe light ($\lambda_{CW}$) from integrated DFB diode laser 610 splits at waveguide coupler C2 923 into the two arms of MZI to SEAMs 924, 926. The CW probe light in each SEAM 924, 926 experiences the nonlinear change in the transmission which modulates the intensity of the CW light. In addition, the optical phase of the CW light is also modulated. This is because the absorption change in each SEAM 924, 926 induced by the corrupted data causes a similar change in the refractive index. The ratio of the refractive index change to the absorption change is related to a parameter called chirp parameter. The chirp parameter can be adjusted by changing the reverse bias of either or both SEAMs 924, 926 or the wavelength of light. The phase- and intensity-modulated CW light beams from the two arms of the MZI are combined at the waveguide coupler C1 921. Interference of the optical fields of the two CW light beams at C1 results in a transmission window of width $\Delta t$ given by the ratio of $\Delta z$ and the propagation velocity of the CW light in the waveguide. The response of the regenerator 900 is therefore no longer limited by the recovery time of the absorption. Further, a voltage-controlled resistive element 915 (such as resistive film) can be deposited on a waveguide of one of the arms of the MZI to fine-tune $\Delta t$ by changing the refractive index using a thermal effect.

The embodiment of the present invention utilizes the phase modulation of the SEAMs to enhance the all-optical regeneration performance using an interferometric technique. Further, the amount of phase modulation can be controlled by the reverse bias applied to the SEAMs 924, 926.

Alternative interferometric designs having a SEAM can be used such as a chelson interferometer or loop mirror.

Figure 10:
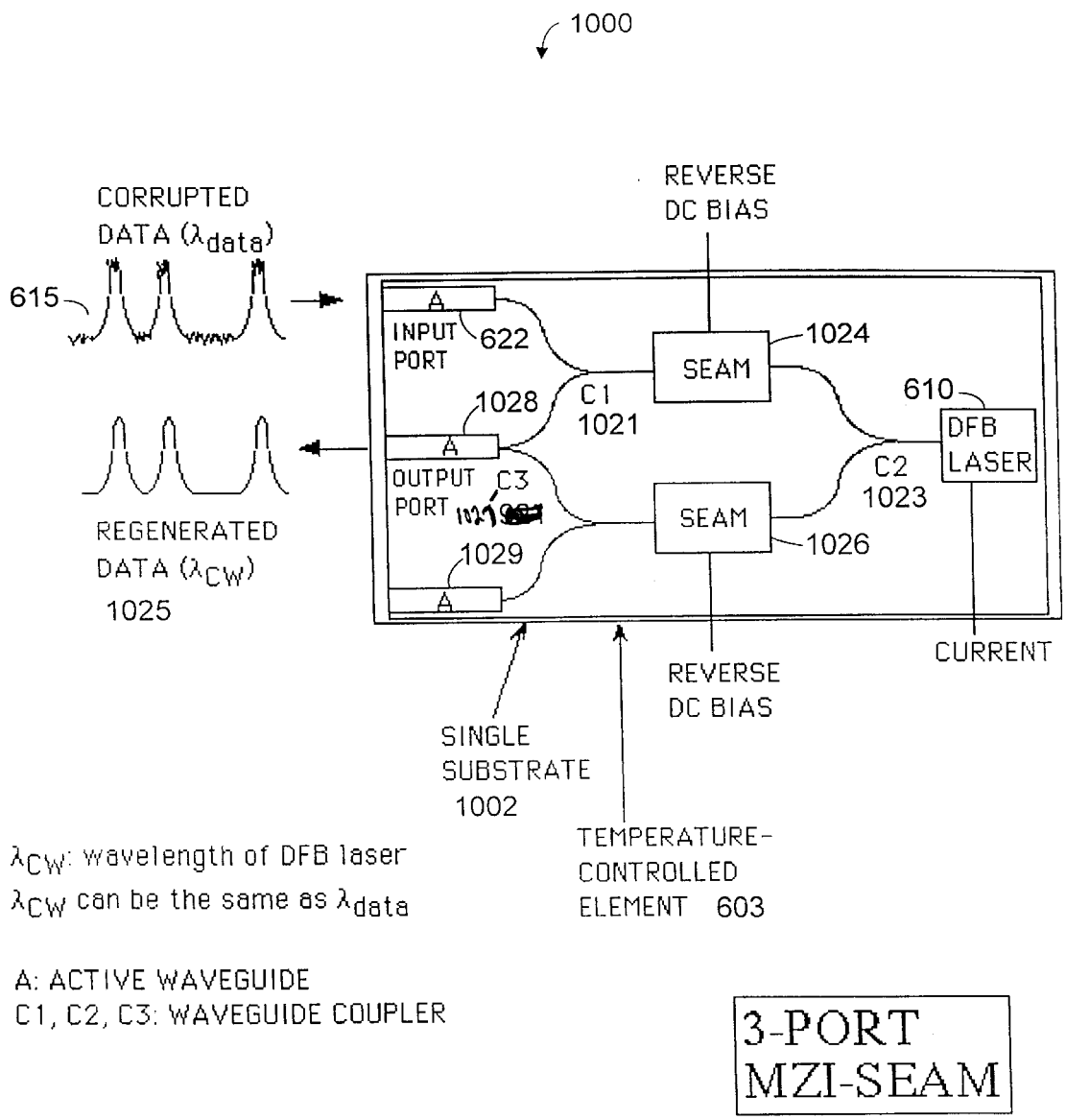
FIG. 10 is a diagram of an all-optical 3-port MZI-SEAM regenerator according to one embodiment of the present invention.

8. 3-Port Mach-Zehnder Interferometer Semiconductor Electroabsorption Modulator (MZI-SEAM) Regenerator FIG. 10 is a diagram of an all-optical 3-port MZI-SEAM regenerator 1000 according to one embodiment of the present invention. This apparatus includes three ports 622, 1028, 1029, three waveguide couplers C1–C3 (1021, 1023, 1027), two SEAMs 1024, 1026, DFB laser 610, and temperature controlled element 603. The three ports 622, 1028, 1029, three waveguide couplers C1–C3 (1021, 1023, 1027), two SEAMs 1024, 1026, and DFB laser 610 are arranged in a Mach-Zehnder interferometer configuration having two arms, and are all integrated on a single substrate 1002.

The three ports 622, 1028, 1029 have three respective active waveguides on one face of single substrate 1002. Port 622 is an input port. Port 1028 is an output port. Each SEAM 1024, 1026 is placed in a respective arm of the Mach-Zehnder interferometer (MZI). CW probe light from the DFB laser ($\lambda_{CW}$) splits at the coupler C2 1023 and propagates into the SEAMs 1024, 1026. The applied reverse DC biases of SEAMs 1024, 1026 are adjusted to balance the MZI such that in the absence of corrupted data pulses the CW probe light at output port 1028 is zero. The pump signal 615 with corrupted data at wavelength ($\lambda_{data}$) is launched into input port 622 of the device at which an active amplifying region (A) increases the intensity of the data. The waveguide coupler C1 1021 directs the amplified pump signal with corrupted data into SEAM 1024 in the upper arm of the MZI. The transmission of SEAM 1024 is reduced nonlinearly with the intensity of the data pump signal 615. The CW probe light in SEAM 1024 from laser 610 experiences the nonlinear change in transmission which modulates the intensity of the CW probe light in the SEAM 1024 in the upper arm of the MZI.

In addition, the optical phase of the CW probe light is also modulated. This is because the absorption change in the SEAM 1024 induced by the pump signal 615 with corrupted data causes a similar change in the refractive index. The ratio of the refractive index change to the absorption change is related to a parameter called chirp parameter. The chirp parameter can be adjusted by changing the reverse bias of the SEAM or the wavelength of light. The phase- and intensity-modulated CW light at the upper arm and the nonmodulated CW probe light at the lower arm of the MZI are combined at the coupler C3 1027. Interference of the optical fields of the two CW lights at the coupler C3 1027 produces an optical regeneration signal 1025 which includes a pulse at $\lambda_{CW}$ whenever a data pulse in pump signal 615 is present.

In this embodiment, the present invention utilizes the phase modulation of SEAM 1024 to enhance the regeneration performance using interferometric technique. Further, the amount of phase modulation can be controlled by varying the reverse biases of one or both of the SEAMs 1024, 1026.

9. SEAM-Based Optimized Receiver

Figure 11:
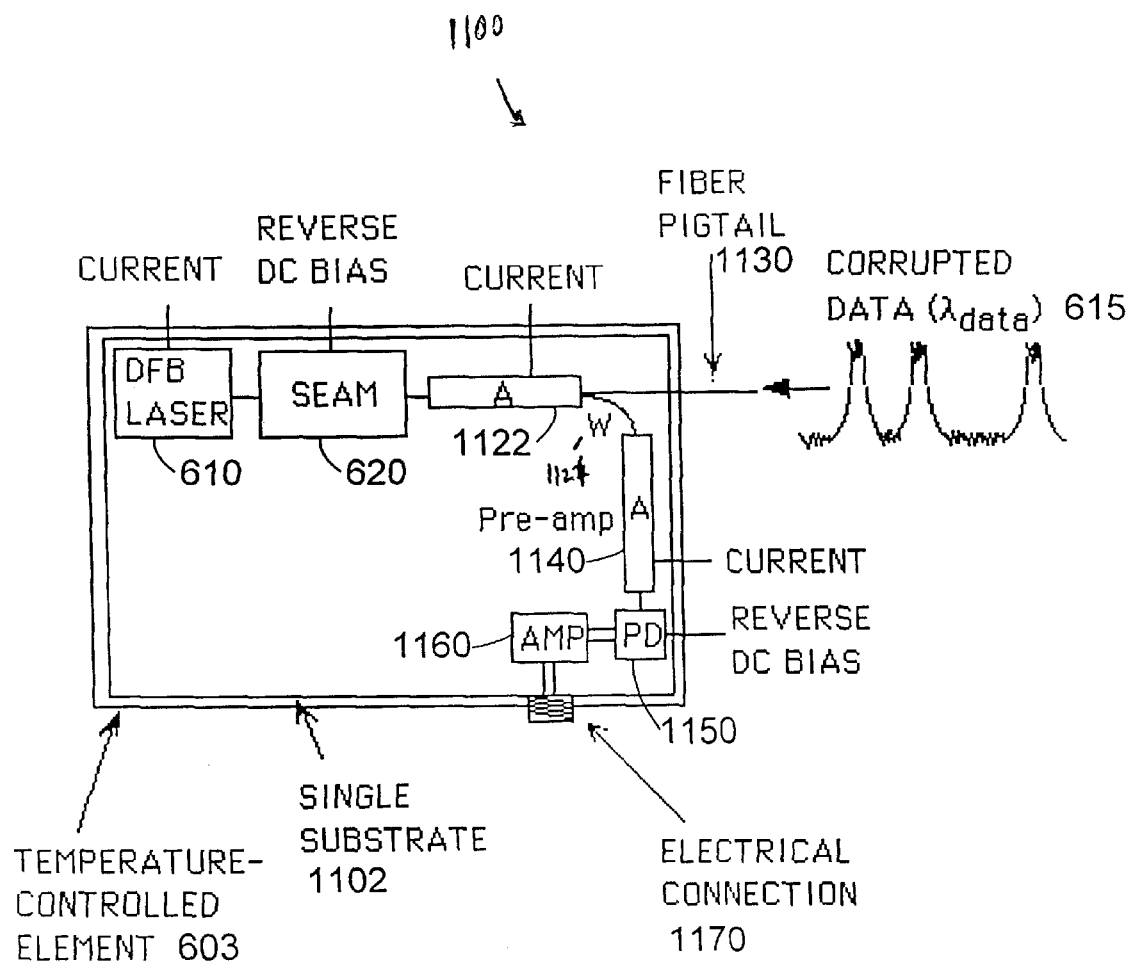
FIG. 11 is a diagram of a SEAM-based optimized receiver according to one embodiment of the present invention.

FIG. 11 is a diagram of a SEAM-based optimized receiver 1100 according to one embodiment of the present invention. The SEAM-based optimized receiver has DFB-SEAM regenerator. As described with respect to FIG. 6, DFB-SEAM regenerator includes a DFB laser 610, SEAM 620, and active amplifying waveguide 1122. The active amplifying waveguide 1122 is followed by an optical pre-amplifier 1140, photodetector 1150, and electronic amplifier 1160. A waveguide coupler W 1121 (e.g., a 2 to 1 directional coupler) is provided in an optical path between active amplifying waveguide 1122 and optical pre-amplifier 1140. These components (DFB laser 610, SEAM 620, active amplifying waveguide 1122, optical pre-amplifier 1140, photodetector 1150, and electronic amplifier 1160) can be integrated on the single semiconductor substrate 1102. A fiber pig tail 1130 is coupled to waveguide coupler W 112 1 to allow a pump signal 615 with corrupted data to be passed to SEAM 620.

The optical regenerated signal output from DFB-SEAM generator (active waveguide 1122) is directed by waveguide coupler W 1121 to an amplifying region, that is, active waveguide A 1140. The amplified optical regenerated signal is then converted to an electrical signal by photodetector 1150. An electronic amplifier 1160 amplifies the detected signal. An output from electrical connection 1170 can be sent to an electronic low-pass filter and other electronic devices such as an error detector. The all-optical SEAM regenerator suppresses noise level in both the one and zero bits by its optically-controlled nonlinear transmission response. Further, the wavelength of the DFB laser 610 can be chosen to optimize the response of the optical pre-amp 1140 and the photodetector 1150. This enhances the overall sensitivity of the receiver.

The present invention offers a simple and cost-effective solution in optimizing the performance of conventional receiver. This is achieved by adding a SEAM regenerator (also called a decision circuit) at the front end of a receiver. The SEAM discriminates noise from the desired signal all in the optical domain without conversion to electrical signal. As a result, no expensive electronic upgrades will be required for scaling to higher bit rate operation.

Note in each of the above embodiments, the wavelength $\lambda_{probe}$ (including $\lambda_{CW}$) can be any wavelength within the infra-red to visible spectrum depending upon the particular laser source used. In one example, $\lambda_{probe}$ is within a fiber optic communication wavelength window, including but not limited to, the 1310 nm band or 1550 nm band windows. The 1550 nm band is the C-band (1530–1565 nm) and the L-band (1560–1610 nm) is supported by erbium-doped fiber amplifiers.

Note that the range of C- and L-bands are expanding at a rapid pace due to intense research driven by the market demand of dense WDM technology. The same technologies and similar semiconductor materials used to construct these diode lasers can be applied to the SEAM regenerator. Therefore, the operating wavelength range of the SEAM regenerator includes, but is not limited to, that of semiconductor diode lasers. By selecting the proper semiconductor material with band edge or absorption edge near the desired wavelength, each SEAM regenerator of the present invention can be operated at any wavelengths including fiber-optic communications bands (1310- and 1550-nm).

10. Conclusion

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An all-optical regenerator, comprising:
   a semiconductor electroabsorption modulator (SEAM) that receives a probe signal and a pump signal, and in response, outputs an optical regenerated signal that is a replica of the pump signal at a wavelength of the probe signal;
   a fiber optic circulator that couples the pump signal and the probe signal into said SEAM and outputs the optical regenerated signal;
   a fiber amplifier; and
   an optical bandpass filter, optically coupled to between said fiber optic circulator and said fiber amplifier that filters the optical regenerated signal and outputs the filtered optical regenerated signal to the fiber amplifier.

2. The all-optical regenerator of claim 1, wherein the probe signal has a first wavelength and the pump signal has a second wavelength, the first and second wavelengths being substantially identical, and said optical regenerated signal has said first wavelength of the probe signal.

3. The all-optical regenerator of claim 1, wherein said first wavelength is within at least one of a 1310 nm band or a 1550 nm band.

4. The all-optical regenerator of claim 1, wherein said pump signal has a modulation representing return-to-zero binary data at a bit rate equal to or greater than ten Gb/s.

5. The all-optical regenerator of claim 1, wherein said SEAM exhibits transmission characteristics whose non-linearity increases with respect a reverse DC bias voltage over a range between 0 and 5 volts.

6. The all-optical regenerator of claim 1, wherein said SEAM comprises a semiconductor material which exhibits an electroabsorption effect.

7. The all-optical regenerator of claim 1, wherein said SEAM comprises a semiconductor material which exhibits at least one of a Franz-Keldysh effect, quantum confined Stark effect, or Wannier-Stark effect.

8. The all-optical regenerator of claim 1, wherein said SEAM comprises
    a semiconductor material having at least one of direct bandgap bulk semiconductor material, a double heterostructure layer, quantum well, or superlattice.

9. The all-optical regenerator of claim 1, wherein said SEAM comprises a semiconductor material selected from one of the following materials: GaAs, InGaAs, InGaAsP, InP, InGaAlAs, GaAlAs, and InAlAs.

10. The all-optical regenerator of claim 1, wherein the probe signal and the pump signal counter-propagate in opposite directions in said SEAM.

11. The all-optical regenerator of claim 1, wherein the probe signal and the pump signal co-propagate in the same direction in said SEAM.

12. An all-optical regenerator, comprising:
    a semiconductor electroabsorption modulator (SEAM) that receives a probe signal and a pump signal, and in response, outputs an optical regenerated signal that is a replica of the pump signal at a wavelength of the probe signal;
    a probe laser that emits the probe signal;
    a first polarization controller that receives the emitted probe signal and forwards the emitted probe signal in a first polarization state to said SEAM;
    fiber optic circulator;
    a second polarization controller that receives the pump signal and forwards the pump signal in a second polarization state to said fiber optic circulator;
    wherein said SEAM receives the probe and pump signals simultaneously or nearly simultaneously from counter-propagating directions, and outputs the optical regenerated signal to said fiber optic circulator.

13. The all-optical regenerator of claim 12, further comprising:
    a fiber amplifier; and
    an optical bandpass filter optically coupled to between said fiber optic circulator and said fiber amplifier, that filters the optical regenerated signal and outputs the filtered optical regenerated signal to the fiber amplifier.

14. The all-optical regenerator of claim 1, further comprising:
    a probe laser that emits the probe signal, wherein said probe laser comprises a continuous wave laser or a modulated laser.

15. The all-optical regenerator of claim 1, further comprising:
    a probe laser that emits the probe signal, wherein said probe laser comprises a DFB laser.

16. The all-optical regenerator of claim 1, further comprising:
    a probe laser that emits the probe signal; and
    a substrate, wherein said probe laser and said SEAM are integrated on said substrate.

17. An all-optical regenerator, comprising:
    a semiconductor electroabsorption modulator (SEAM) that receives a probe signal and a pump signal, and in response, outputs an optical regenerated signal that is a replica of the pump signal at a wavelength of the probe signal;
    a probe laser that emits the probe signal;
    a substrate; and
    an amplifying waveguide region that amplifies the optical regenerated signal and outputs an amplified optical regenerated signal; wherein said probe laser, said SEAM, and said amplifying waveguide region are optically coupled along a common optical path and integrated on said substrate.

18. The all-optical regenerator of claim 17, further comprising an optical discriminator optically coupled to receive said amplified optically regenerated signal output from said amplifying waveguide region.

19. The all-optical regenerator of claim 18, wherein said optical discriminator comprises a fiber Bragg grating.

20. The all-optical regenerator of claim 18, further comprising:
    a fiber optic circulator optically coupled between said amplifying waveguide region and said optical discriminator.

21. The all-optical regenerator of claim 17, further comprising:
    a coupler;
    a pre-amplifying waveguide region;
    and a photodetector; wherein said coupler, said pre-amplifying waveguide region, and said photodetector are integrated on said substrate.

22. The all-optical regenerator of claim 1, further comprising:
    a substrate;
    a probe laser that emits the probe signal;
    an amplifying waveguide region that amplifies the pump signal; and
    a coupler that optically couples outputs of said probe laser and said amplifying waveguide region to an input of said SEAM; wherein said probe laser, said SEAM, said coupler, and said amplifying waveguide region are integrated on said substrate.

23. An all-optical regenerator, comprising:
    a semiconductor electroabsorption modulator (SEAM) that receives a probe signal and a pump signal, and in response, outputs an optical regenerated signal that is a replica of the pump signal at a wavelength of the probe signal;
    a substrate;
    a probe laser that emits the probe signal;
    an amplifying waveguide region that amplifies the pump signal;
    a coupler that optically couples outputs of said probe laser and said amplifying waveguide region to an input of said SEAM; wherein said probe laser, said SEAM, said coupler, and said amplifying waveguide region are integrated on said substrate; and
    a polarizing beam splitter optically coupled to receive said optically regenerated signal output from said SEAM.

24. An all-optical regenerator, comprising:
    a semiconductor electroabsorption modulator (SEAM) that receives a probe signal and a pump signal, and in response, outputs an optical regenerated signal that is a replica of the pump signal at a wavelength of the probe signal; wherein said SEAM comprises a first SEAM and a second SEAM; and wherein each of said first and second SEAMs are arranged in respective arms of an interferometer.

25. The all-optical regenerator of claim 24, further comprising:

a substrate;

first and second couplers, said first and second SEAMs being arranged in separate optical paths between said first and second couplers;

a probe laser that emits the probe signal to said first coupler; and an amplifying waveguide region that amplifies at least the pump signal and outputs the amplified pump signal through said second coupler to said first and second SEAMs; wherein said first and second couplers, said probe laser, said first and second SEAMs, and said amplifying waveguide region are integrated on said substrate.

26. The all-optical regenerator of claim 25, further comprising a resistive element integrated on said substrate and optically coupled between said first SEAM and said amplifying waveguide region.

27. The all-optical regenerator of claim 24, further comprising:

a substrate;

first, second, and third couplers;

first and second amplifying waveguide regions; and a probe laser that emits the probe signal to said first coupler;

wherein said second coupler is optically coupled between said first amplifying waveguide region and said first SEAM; and wherein said third coupler is optically coupled between said second amplifying waveguide region and said second SEAM; wherein said first, second and third couplers, said probe laser, said first and second SEAMs, and said first and second amplifying waveguide regions are integrated on said substrate.

28. An all-optical method for regenerating an optical pump signal corrupted by optical noise comprising the steps of:

(1) biasing a semiconductor electroabsorption modulator (SEAM);

(2) forwarding a probe signal in a first polarization state to said SEAM;

(3) forwarding a pump signal in a second polarization state to a fiber optic circulator;

(4) inducing said SEAM to transmit a regenerated optical signal that is a replica of the pump signal at a wavelength of the probe signal, wherein said SEAM outputs the regenerated optical signal to the fiber optic circulator;

(5) suppressing reflected residual pump signal pulses at the output of the fiber optic circulator;

(6) optically amplifying the regenerated optical signal; and (7) suppressing the optical amplifier noise.

29. An all-optical signal regenerator comprising:

semiconductor electroabsorption modulator (SEAM) means for transmitting a regenerated optical signal that is a replica of a pump signal at a wavelength of a probe signal, wherein said SEAM means is under reverse bias;

polarization controller means for controlling the polarization states of the pump signal and the probe signal;

optical fiber circulator means for launching the pump signal and the probe signal into said SEAM means, and separating the pump signal from the regenerated optical signal;

first filtering means for suppressing reflected residual pump signal pulses;

optical amplifying means for compensating for insertion loss of said SEAM means; and second filtering means for suppressing optical amplifier noise.

* * * * *